US005748101A

United States Patent [19]

Christensen et al.

[11] Patent Number: 5,748,101

[45] Date of Patent: May 5, 1998

[54] CONCEALED ACCESS ENTRY SYSTEM FOR A VEHICLE

[76] Inventors: Mark Christensen, 2625 E. Sean, Fresno, Calif. 93720; Alfred L. Fischer, 2202-A Pacific Ave., Costa Mesa, Calif. 92627

[21] Appl. No.: 492,945

[22] Filed: Jun. 21, 1995

Related U.S. Application Data

[63] Continuation of Ser. No. 147,988, Nov. 4, 1993, abandoned.

[51] Int. Cl.[6] .............................. G06F 7/04; B60R 25/00

[52] U.S. Cl. .............................. 340/825.31; 307/10.2

[58] Field of Search .............................. 340/825.31, 825.34, 340/825.69, 825.72; 307/10.2; 235/382, 382.5; 345/172; 180/287, 289; 341/173, 176; 359/142, 145, 148; 364/222.5, 286.4, 286.5, 949.2, 709.05; 395/186, 187.01, 188.01, 200.06, 2.82, 200.55

[56] References Cited

U.S. PATENT DOCUMENTS

| | | | |
|---|---|---|---|
| 2,588,879 | 3/1952 | Richards | 268/59 |
| 3,684,965 | 8/1972 | Gautney et al. | 340/825.69 |
| 3,936,833 | 2/1976 | Bush | 343/225 |
| 4,141,010 | 2/1979 | Umpleby et al. | 340/825.69 |
| 4,241,870 | 12/1980 | Marcus | 296/37.7 |
| 4,247,850 | 1/1981 | Marcus | 340/694 |
| 4,286,262 | 8/1981 | Wahl | 340/694 |
| 4,549,178 | 10/1985 | Lester | 340/825.58 |
| 4,665,395 | 5/1987 | Van Ness | 340/825.31 |
| 4,731,605 | 3/1988 | Nixon | 340/696 |
| 4,750,118 | 6/1988 | Heitschel et al. | 340/825.69 |
| 4,847,601 | 7/1989 | Conti | 341/176 |
| 4,904,993 | 2/1990 | Sata | 340/825.72 |
| 4,912,463 | 3/1990 | Li | 340/825.69 |
| 5,020,845 | 6/1991 | Falcoff et al. | 296/37.7 |
| 5,028,919 | 7/1991 | Hidaka | 340/825.72 |
| 5,064,974 | 11/1991 | Vigneau et al. | 200/61.62 |
| 5,081,534 | 1/1992 | Geiger et al. | 340/825.69 |
| 5,099,233 | 3/1992 | Keenan | 340/825.72 |
| 5,113,182 | 5/1992 | Suman et al. | 340/825.31 |
| 5,184,132 | 2/1993 | Baird | 341/176 |
| 5,187,469 | 2/1993 | Evans et al. | 340/825.72 |
| 5,208,586 | 5/1993 | Friberg et al. | 340/932.2 |
| 5,223,818 | 6/1993 | Polo | 341/176 |
| 5,252,960 | 10/1993 | Duhame | 341/176 |
| 5,255,313 | 10/1993 | Darbee . | |
| 5,341,166 | 8/1994 | Garr et al. | 340/825.72 |
| 5,365,282 | 11/1994 | Levine . | |
| 5,397,923 | 3/1995 | Christensen | 307/9.1 |
| 5,475,366 | 12/1995 | Van Lente et al. | 340/825.69 |
| 5,479,155 | 12/1995 | Zeinstra et al. | 340/825.69 |

*Primary Examiner*—Mark H. Rinehart

[57] ABSTRACT

A method for actuating an access control transmitter in which a four code access transmitter is employed with the dimmer switch flashed once to produce a first signal, twice in rapid succession to produce a second signal, three times in rapid succession to produce a third signal, and four times in rapid succession to produce a fourth succession. Each separate signal is an access controlled signal to gain access to an access controlled area such as a garage. Programming of the access controlled transmitter occurs by actuating a standard transmitter nearby, when the access transmitter is in a programming mode. A programming access mechanism is provided to prevent authorized programming of the access transmitter by one not having the programming access code.

5 Claims, 7 Drawing Sheets

CONCEALED ACCESS ENTRY SYSTEM FOR A VEHICLE

This is a continuation of application Ser. No. 08/147,988 filed Nov. 4, 1993, now abandoned.

FIELD OF THE INVENTION

The present invention relates to the field of electronic access entry devices. More specifically, the present invention relates to a device and system which enables entry access to be accomplished from within a vehicle but without the need for a separate access device to eliminate loss and theft of such separate access device; and also more specifically for a module which permits automatic programming from a separate access device.

BACKGROUND OF THE INVENTION

The best known, most widely available access entry system is the garage door opening system. Modified versions of this system are employed for roll-type doors at security facilities, and for access gates at gated living communities. Other security access functions which may be utilized in conjunction with the triggering of access gates include operation of lights and security systems in structures associated with the access entry mechanism. The widespread use of such systems was possible due both to the relatively inexpensive cost of the electronics necessary to implement the system, the increasing need for security, and the societal demand for convenience.

Such systems work, and can work in a variety of ways, to accomplish the required goals of selectivity, adequate signal strength, and mechanical manipulation of the entry barrier. One of the more popular systems involves the electromagnetic transmission of a digitally encoded pulse. The pulse shape is dependent upon a pre-programming of the transmitter. The receiver is pre-programmed to receive the pulse shape which was pre-programmed into the transmitter.

One of the more popular ways to accomplish the programming is through a series of switches, popularly referred to as dip switches. These are typically small rocker switches oriented in a line, and numbered. There may be four, six, eight or more switches, depending upon the number of transitions available to be transmitted. With each switch capable of two positions, the number of waveforms possible is given as $2^N$ where N is the number of switches. In this way, it is hoped that no two access control receivers will be programmed identically. This aspect, coupled with the relatively short distances over which the transmitters operate have been found to be sufficiently secure for home, and some industrial use.

Citizens have purchased and used secure electronic access controls for a variety of reasons ranging from not having to physically move the access barrier to a desire to avoid leaving a vehicle to open the access door, especially when raining. From a security standpoint, however, the use of these electronic access devices has currently been falling short of the public demand.

The access transmitters are pocket sized and are usually either prominently placed within the vehicle or hidden under a seat. When prominently placed, the access transmitters are an inviting temptation for thieves. A car parked in a driveway at night can have the door opened with a jimmy strip, the electronic transmitter taken, and the car then re-locked without the owner suspecting that a theft has taken place. The owner, thinking that the transmitter is lost, may buy a new one. However the thief, newly armed with the electronic transmitter can gain easy access to the home at a time of his choosing.

Hiding the access transmitter can also lead to more trouble than the convenience it was supposed to provide. The hiding place may prove difficult to access on short notice, especially when it is needed. The hidden access transmitter may shift its location during driving into a position which requires the driver to open the car door and search before access can be had. Where several hiding places are used, each one may have to be accessed before the electronic transmitter is found.

Hiding a portable transmitter may also result in the transmitter being left at a remote location, the driver thinking that the transmitter is in its hiding place. The driver only finds out after returning and an unsuccessful search.

If a vehicle is stolen, and there is sufficient information identifying the owners or their address in the car, the car thief can now easily turn to burglary if the access transmitter is discovered by the thief. This is especially true where the access transmitter is portable, since the thieves would not normally return in the stolen car to the owner's address where the stolen car would be spotted right away.

Not every access limited area operates with a single transmitter and a single door. There are instances where several differing access locations are desired to be selectively accessed. The above problems associated with security, and the multiple access problem is exacerbated with the use of multiple transmitters. For example, where four different vehicles need to selectively access four different access structures, it would be required to carry four separate access transmitters in each vehicle. Having a total of 16 access transmitters virtually insures that several will be lost or stolen, and most likely without the immediate knowledge of the vehicle operator, especially if the access transmitter stolen is not one which is utilized most of the time.

With multiple access transmitters, the driver must fumble through the group of access transmitters to select the correct one. In high emergency situations, this is most undesirable. One of the types of crime which is becoming more prevalent is the follow home robbery. In this type of operation, the thieves follow the victim home and rob and/or kill the victim as he emerges from his vehicle. The use of an electronic access control can defeat this type of crime, but only if the access door can be opened and closed smoothly, within narrow time regimes about the victim's arrival. If the victim has to stop to fumble for the access transmitter or if the thieves have sufficient time to leave their vehicle and enter the controlled access area, the crime can be completed.

Another problem with most electronic access control with a portable access transmitter relates to the electromagnetic transmissions of the digitally encoded signal. The use of an access transmitter from within a car requires the electromagnetic energy to overcome any reflective interference from the metallic roof of the car or from the inside passenger portion of the car, propagate through the windshield, and typically through the access barrier to the receiver.

The range of the access transmitter is limited by its power, which may be limited by the Federal Communications Rules, its internal antenna, and the intended battery consumption rate. Under current conditions and limitations, the range of the access transmitter needs to be increased. If security is of paramount importance, the possibility of battery failure, through battery structural failure or battery depletion, even though infrequent, is unacceptable. Battery failure at the moment where access is most necessary is a failure mode which should be completely eliminated.

Some solutions which have been attempted include the configuration described in U.S. Pat. No. 3,936,833 issued to Walter R. Bush on Feb. 3, 1976, and which discloses a configuration requiring significant interior alterations including an antenna mounted in the passenger compartment, a power supply female housing mounted in the dash, to fit a transmitter. The transmitter used must have electrical contacts matching those on the transmitter, in addition to its requirement of significant interior vehicular modification. Further, the portable transmitter can still be lost and stolen since it operates independently of the female connection in the dash.

U.S. Pat. No. 4,241,870 issued to Konrad H. Marcus Dec. 30, 1980, and discloses a power access female connector mounted on the head liner of a vehicle, which again requires a power connection between the transmitter and the female connector. Again, vehicle interior alteration, and a specialized transmitter is required to be purchased. U.S. Pat. No. 4,247,850 issued to Konrad H. Marcus on Jan. 27, 1981, and discloses a specialized transmitter having a shape which enables it to be disposed within a recess of the sun visor of a vehicle. Coding switches are provided to create what is essentially a visor shaped transmitter.

U.S. Pat. No. 4,286,262 issued to John F. Wahl on Aug. 25, 1981, and discloses a cigarette lighter shaped transmitter to be plugged into a vehicle outlet to tap power from the vehicle power system. This configuration has all of the limitations of a portable transmitter with the additional limitation that a power supply does not appear to be present for use outside the cigarette lighter power environment. U.S. Pat. No. 4,750,118 issued to Heitschel et al on Jun. 7, 1988, and which discloses a programmable receiver which enables access from more than one transmitter. U.S. Pat. No. 4,549,178 issued on Oct. 22, 1985 to James N. Lester discloses an energy control system using a frequency controllable oscillator.

U.S. Pat. No. 4,731,605 issued on Mar. 15, 1988 to James E. Nixon discloses the relocation of a battery operated garage door opener to a remote location within the vehicle, with a voltage regulator to enable use of the vehicle's twelve volt system and where the input power is connected to the transmitter which is bolted down. U.S. Pat. No. 4,847,601 issued on Jul. 11, 1989 to William S. Conti has a disclosure similar to that of Nixon in the '605 patent, but with the addition of a separate switch for activation.

U.S. Pat. No. 5,020,845 issued on Jun. 4, 1991 to Falcoff et al and U.S. Pat. No. 5,064,974 issued on Nov. 12, 1991 to Vigneau et al, and both show an overhead console for holding a portable transmitter. U.S. Pat. No. 2,588,879 issued to G. F. Richards on Aug. 23, 1948 illustrates a momentary pulse transmitter and receiver for opening a garage door.

What is needed is an electronic access control system which does not have the limitations of abbreviated transmit range, failure prone power supply, single access control, being subject to theft, being unconcealed, and being difficult to program. The needed access transmitter should be amenable to operation from inside a vehicle and with ready and un-obvious access to the driver.

SUMMARY OF THE INVENTION

The electronic access system and access transmitters of the present invention encompasses both an apparatus and method enabling access to be controlled from the light dimmer switch at the driver's position in a vehicle. In one configurative embodiment, the electronics for an improved access transmitter are mounted in a box under the hood. The access transmitter is powered by the powerful twelve volt vehicle battery and will thus not be subject to battery failure so long as the vehicle is operable.

The access transmitter of the present invention is triggered by the dimmer switch of the headlight system of the vehicle. In the preferred embodiment, and where a four code access control transmitter is used, the dimmer switch can be flashed on once to produce a first signal, twice in rapid succession to produce a second signal, three times in rapid succession to produce a third signal, and four times in rapid succession to produce a fourth signal.

The manner of programming of the access transmitter of the present invention is automatic. A conventional, portable access transmitter is placed in proximity to the access transmitter and antenna of the present invention, and actuated. The access transmitter 35 has a receiver section which recognizes the presence of an electromagnetic signal. The presence of a signal begins to place the access transmitter of the present invention in program mode. A signal strength amber light emitting diode illuminates indicating the presence of a signal. Continuing to actuate the portable access transmitter for a period of 2 seconds will allow a user to enter the first step of the programming mode, which is a security access mode. To insure that the owner is the only person to input code to program the transmitter, each access transmitter will have a code which must be input as an input code restriction which must be met before the user will be allowed to install any access codes.

Once the access codes are to be entered, the user will also select an address at which the access entry code is to be stored. Selection of the code address is again accomplished by actuating the portable access transmitter a number of times, typically either 1, 2, 3, or 4 times, rapidly. Once confirmation has been made of the proper address, the final step is code installation.

Code installation is simply a matter of actuating the portable access transmitter near the access transmitter of the present invention once the illumination of the programming and security light emitting diodes has occurred, and continuing to transmit with the portable access transmitter until such light emitting diodes no longer are illuminated. After this step, the user is given five seconds to install codes in additional addresses prior to returning to the transmit ready mode where the access transmitter of the present invention is ready to transmit the access codes stored in a selectable one of its memory locations.

The access transmitter of the present invention will be triggered by the dimmer switch. As will be shown, the dimmer switch can be connected in a manner which will enable the dimmer switch to activate the access transmitter whether or not the headlights are on.

On a more detailed level, the access transmitter of the present invention installs with only three wires under the vehicle hood. Although some installations may vary, these three wires are normally connected to power, ground, and the hi-beam conductor. The access transmitter of the present invention has no moving parts, and is permanently sealed in a housing having dimensions of approximately 3¼ inch by 2¾ inches by 1 inch. This size is small enough that the access transmitter of the present invention may be installed upon and operated from a motorcycle.

The preferred embodiment will have up to four addresses for transmitter codes, although it is understood that the capability of remembering and transmitting any number of transmitter codes is possible. Further, the access transmitter of the present invention frees up the existing access transmitter for other uses. The existing access transmitter is only needed for the initial programming of the access transmitter of the present invention. A single handheld transmitter can code as many vehicle access codes as needed by changing the switches in the handheld transmitter, particularly if the other handheld transmitters are unavailable at the time of programming. In addition, a single access transmitter can be program as with many access transmitters as desired.

Optimum security for access control is achieved since the access transmitters are placed completely out of view; can only be operated with ignition key in "on" position; can only be programmed knowing the owner's input security code, and with an already available security code; and if tampered with or taken from vehicle can cause the codes to be eliminated from memory to render the access transmitter unit inoperable. This is because the access transmitter of the present invention is hooked directly to the vehicle battery and has only volatile memory. The access control transmitter of the present invention does not need batteries, and can accept multiple opener codes of multiple frequencies.

Other advantages are gained since the access control transmitter of the present invention requires no costly vehicle interior installation, yet is made of inexpensive ruggedized parts for ease of manufacture, low cost and long life. The use of the access transmitter of the present invention also frees space within a vehicle interior normally occupied by a portable access transmitter, especially storage spaces.

Further, the access transmitter of the present invention can be configured to send a controlled transmission burst. This is seldom the case with a handheld where it is not uncommon for multiple attempts at sending a signal to be required. Further, the present access transmitter is more accessible and easier to operate for those who cannot easily or quickly reach visors or other more traditional storage areas, especially the elderly, handicapped, and those with arthritis. The use of the access transmitter involves the use of different and significantly lighter motion to activate rather than having to squeeze portable access transmitter buttons which are deliberately designed to be difficult to activate to prevent being inadvertently left in a position where they are continuously being activated. Further, since the access transmitter of the present invention is permanently installed, it cannot be lost as would a portable transmitter. Physical access to the access transmitter via the dimmer switch eliminates the possibility of children playing with the transmitter and inadvertently triggering the access door unintentionally. This is particularly a problem where a child re-opens the door as the user is driving away, thus leaving the restricted access area open and unattended for long periods of time.

The use of an access transmitter in a vehicle increases safety since it is not necessary to remove the hands from the steering controls, nor to shift the eyes away from the view at hand. The view at hand might range from looking for children in front of the vehicle while driving, to checking for drive up thieves or intruders approaching from the rear.

The use of an access transmitter from a motorcycle is especially needed since the removal of hands from the steering and signalling area is especially dangerous. The motorcycle rider would otherwise have to fish about in his pockets to produce a portable transmitter. Where the access entry is on a hill, the use of a portable transmitter, which would require stopping and a search for the transmitter, could be dangerous.

Where utility or common carrier vehicles must reaccess a secured area, the use of an access transmitter not requiring separate location and actuation could prove most advantageous. Airport busses which enter and leave secured areas continually during the course of the day would, in the case of a portable transmitter, require the driver's attention to be taken away from the road and significantly increase the probability of an accident. Where a portable transmitter could be lost, valuable work time would be lost waiting for a replacement. In the case of an airport secured area, a lost portable access transmitter could result in compromise of airport security which could result in hijackings and loss of life.

DETAILED DESCRIPTION OF THE PREFERRED EMBODIMENTS

Figure 1:
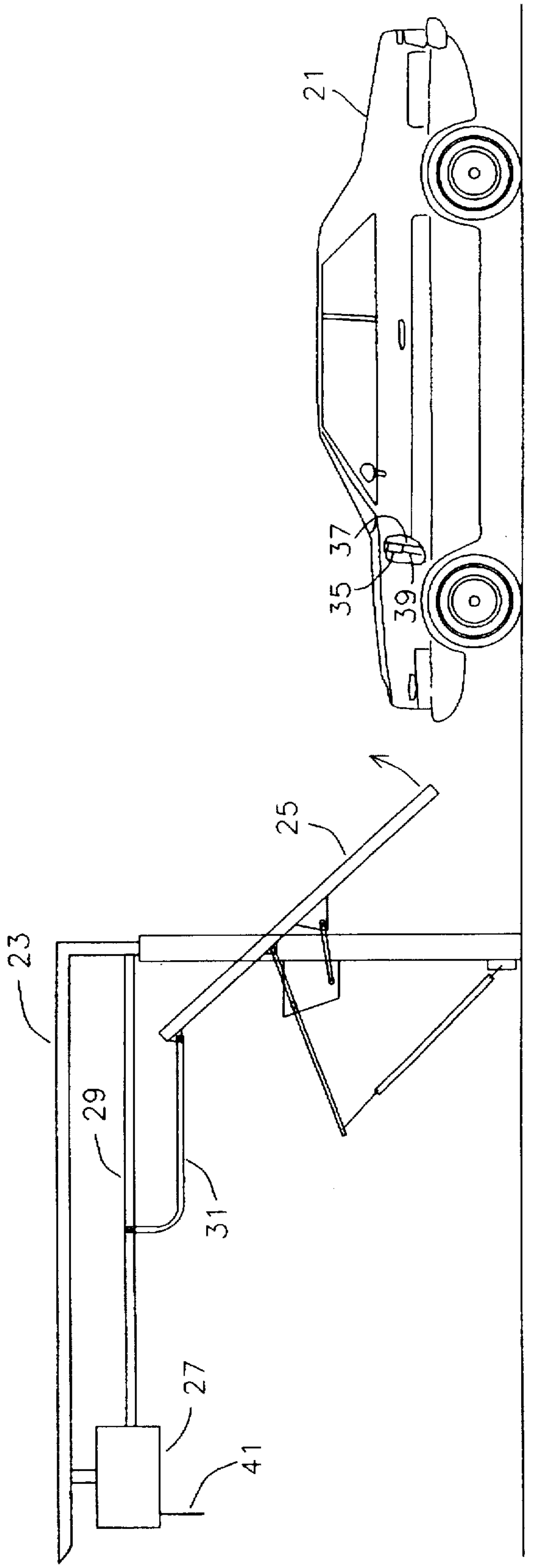
FIG. 1 is a simplified side view of an access system involving a vehicle, under hood transmitter, access door, and receiver/access door actuator.

The description and operation of the invention will be best described with reference to FIG. 1. FIG. 1 is a side view of a vehicle 21 as it approaches a structure, in this case a garage 23, into which access is sought. The garage 23 has a door 25 which is hinged to swing open, especially when actuated by a door drive unit 27 which includes a receiver (not shown), and which may be integrally packaged as a door drive unit 27 which includes the receiver within its housing.

The door drive unit 27 will typically include a drive track 29 which may include a worm gear operable with a follower 31 attached to the door 25. As shown on a broken away portion of the vehicle 21, an access transmitter 35 is shown mounted on the firewall 37 of the vehicle. Access transmitter 35 has a downwardly extending antenna 39 which will typically be a hanging wire. Note that the door drive unit 27 also has a downwardly extending antenna 41 which will also typically be a hanging wire.

Figure 2:
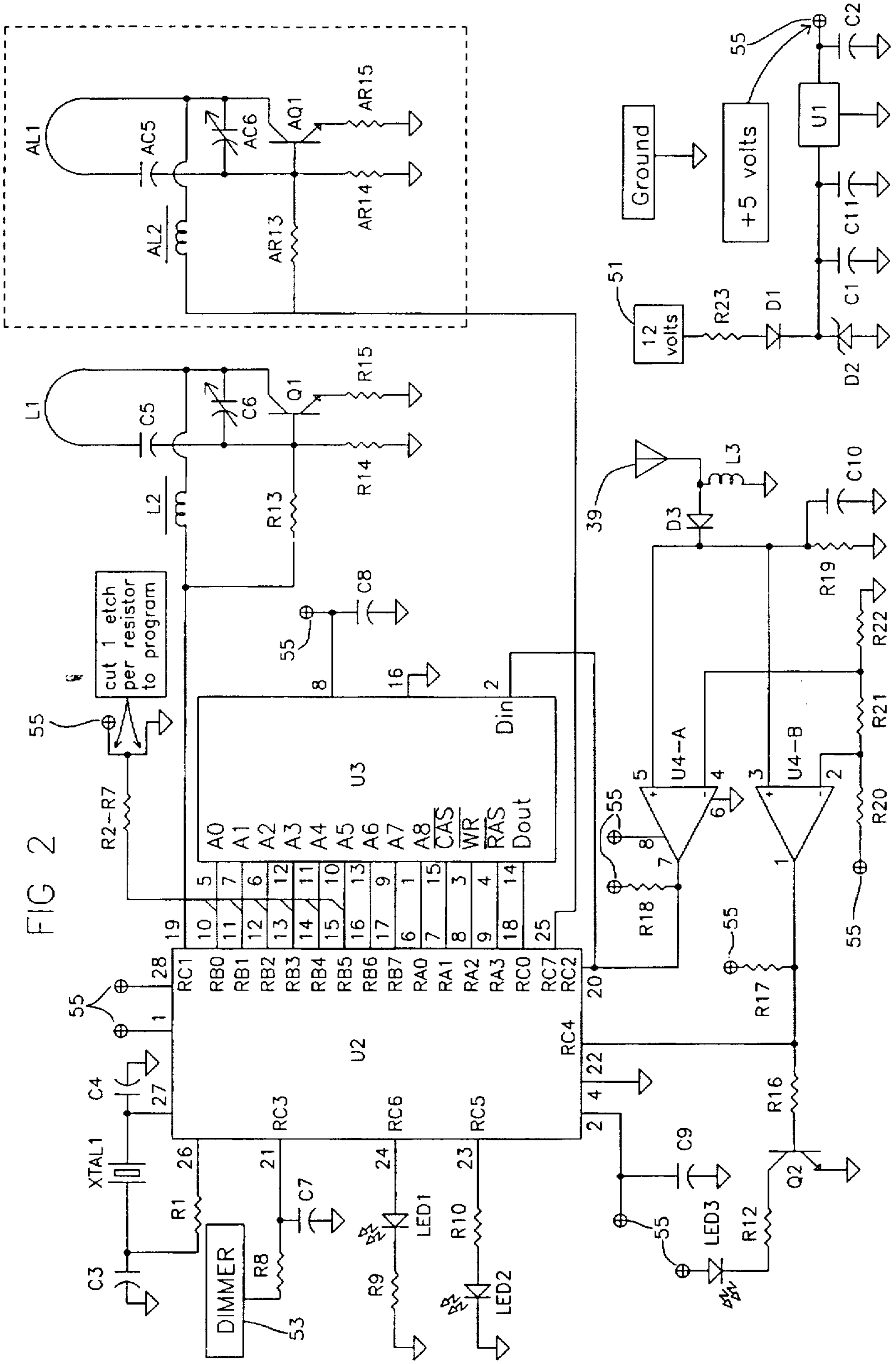
FIG. 2 is a schematic diagram of one possible embodiment of a circuit for the access transmitter of the present invention.

Referring to FIG. 2, the circuitry details of the electronics of the access transmitter 35 are illustrated. At the lower right portion of the schematic of FIG. 2, a detail of the five volt power is illustrated. The 12 volt power supply 51 of the vehicle, typically a standard 12 volt nominal vehicle battery, has its positive terminal connected through a resistor R23 to the current input side of a transistor D1. The negative terminal of power supply 51 is connected to ground as is shown by the ground arrow.

The current output side of diode D1 is connected to a power regulator U1. The current output side of diode D1 is also connected to ground through a parallel combination of capacitors C1 and C11 and into the current output side of a zener diode D2. The current input side of zener diode D2 is connected to ground.

Power regulator U1 has a ground connection, and an output of about 5 (five) volts which terminates in a circled positive sign, and which is also connected to ground through a capacitor C2. Further circled positive signs will appear in the remaining portion of the circuit to illustrate a connection to the output of the power regulator U1.

An input to the main portion of the circuit entitled "DIMMER" is labeled 53 and represents a voltage high signal which will come from the vehicle dimmer switch. This dimmer input 53 is connected through a resistor R8 to an input terminal 21 of microprocessor U2. Input terminal 21 is also connected to ground through a capacitor C7.

Microprocessor U2 has an output at terminal 24 connected through a red light emitting diode LED1 and a resistor R9 to ground, and an output at terminal 23 connected through a green light emitting diode LED2 and a resistor R10 to ground.

Terminal 2 of microprocessor U2 is connected to the 5 volt supply 55 of power regulator U1 and to ground through a capacitor C9. Terminal 4 of microprocessor U2 is connected to ground. At the upper portion of the microprocessor U2, terminal 26 is connected through a resistor R1 and capacitor C3 to ground. The junction between the resistor R1 and capacitor C3 is connected to one side of a crystal XTAL1. The other side of a crystal XTAL1 is connected to terminal 27 of microprocessor U2 and through a capacitor C4 to ground. Microprocessor U2 also has inputs 1 and 28 which are connected to the 5 volt supply 55.

Terminal 20 of microprocessor U2 is connected to a terminal 2 of a memory chip U3. Other connections between microprocessor U2 and memory chip U3 have been established. Terminals 10, 11, 12, 13, 14, 15, 16, 17, 6, 7, 8, 9, and 18 of microprocessor U2 are connected to terminals 5, 7, 6, 12, 11, 10, 13, 9, 1, 15, 3, 4, and 14 of memory chip U3.

The previously described programming access security code is accomplished by the use of a series of resistors R2–R7 are provided, each having a first end connected to both the five volt power supply 55 and to ground. For each resistive circuit, a conductor may be broken between the five volt power supply 55 and ground, either upstream or downstream of the connection with the resistor. The other ends of the resistors R2–R7 are connected to terminals 10, 11, 12, 13, 14, 15, and 16, respectively of the microprocessor U2. Cutting the conductor upstream of the resistor will cause the terminal to be grounded through the resistor. Cutting the conductor downstream of the resistor will cause the terminal to achieve a high voltage level through current flow from the five volt power supply 55 through the resistor.

The connections between the ends of the resistors R2–R7 and ground may be broken to cause the terminals 10, 11, 12, 13, 14, 15, and 16, respectively of the microprocessor U2 to be selectively chosen to go "high", or "low." However, since the resistances establishing such state occur through high resistances, these connections between U2 and U3 can still be used to pass information. This is because a reset condition can drive all terminals to ground, and information can be carried before the high resistance resistors R2–R7 will effectively allow the "hard" programming of cut conductors to take effect.

The programming input security access code may be programmed to take place within three "windows." During each window, the portable access transmitter can be actuated from 0 to 3 times to indicate a number for that window. By dividing the actuation opportunity into windows, it eliminates the need to actuate the portable transmitter many times to enter a code. The requirement to actuate many times could easily cause the user to lose count. This technique gives a base four number of $4^3$ combinations, or 64 possible programming access codes. It is understood that the programming access codes are optional and may be omitted from the access transmitter 35 of the present invention, if desired.

In the transmitter section, terminal 19 and 25 of microprocessor U2 are connected to a main and auxiliary transmitter section, respectively. The auxiliary transmitter section is illustrated as surrounded by a dashed box. Terminal 19 the microprocessor U2 is connected to one end of an inductor L2 and to one end of a resistor R13 in a circuit extending further to the right of FIG. 2. The other end of resistor R13 is connected to the base of a transistor Q1, to ground through a resistor R14, to one end of a capacitor C5 and to one end of a variable capacitor C6. The other ends of the capacitors C5 and C6 are connected to each other through an inductor L1. The other end of capacitor C6 is connected to the other end of the inductor L2. The other end of inductor L2 is also connected to the collector of transistor Q1. The emitter of transistor Q1 is connected to ground through a resistor R15.

A second, alternate transmitter section is connected to terminal 25 of microprocessor U2. Terminal 19 of the microprocessor U2 is connected to one end of an inductor AL2 and to one end of a resistor AR13 in a circuit extending further to the right of FIG. 2. The other end of resistor AR13 is connected to the base of a transistor Q1, to ground through a resistor AR14, to one end of a capacitor AC5 and to one end of a variable capacitor AC6. The other ends of the capacitors AC5 and AC6 are connected to each other through an inductor AL1. The other end of capacitor AC6 is connected to the other end of the inductor AL2. The other end of inductor AL2 is also connected to the collector of transistor AQ1. The emitter of transistor AQ1 is connected to ground through a resistor AR15. The alternate transmitter section is provided in the event that the user has access devices which operate on more than one frequency.

Each transmitter section is tuned for a particular output frequency. The capacitors C6 or AC6 are tuned to set the transmitter section to the particular output frequency. In the embodiment of FIG. 2, the modulation of the transmitter section is performed directly by the microprocessor U2.

A terminal 8 of memory chip U3 is connected to the five volt power supply 55 and to ground through a capacitor C8. A terminal 16 of memory chip U3 is connected to ground.

At the bottom of the circuitry of FIG. 2, a voltage comparator U4-A has a positive input terminal 5 connected to ground through a resistor R19, a negative input terminal 4 connected to ground through a resistor R22, and to one end of a resistor R21, an output connected through a resistor R18 to the five volt power supply 55 and to terminal 20 of microprocessor U2 and terminal 2 of memory chip U3. The power in terminal 8 and ground terminal 6 of the voltage comparitor U4-A are connected to the five volt power supply 55 and ground, respectively.

An antenna 39 is connected to ground through an inductor L3 and the current input side of a diode D3. The current output diode of the diode D3 is connected to ground through a capacitor C10 and to positive input terminal 5 of voltage comparitor U4-A.

A voltage comparitor U4-B has a positive input terminal 3 connected to the current output side of the diode D3 and is connected to ground through the previously mentioned capacitor C10 and resistor R19. Voltage comparitor U4-B has a negative input terminal 2 connected to the other end of resistor R21 and to the five volt power supply 55 through a resistor R20. Voltage comparitor U4-B derives its power and ground through the terminals identified for voltage comparitor U4-A. The output of voltage comparitor U4-B is connected through a resistor R17 to the five volt power supply 55 and to terminal 22 of microprocessor U2 and through a resistor R16 to the base of a transistor Q2. The emitter of transistor Q2 is connected directly to ground, while the collector of transistor Q2 is connected to the current output terminal of an amber light emitting diode LED3. The current input terminal of the amber light emitting diode LED3 is connected through a resistor R12 to the five volt power supply 55. The component values which have proven successful in the implementation of the circuit of FIG. 2 is shown in Table 1 below. All resistors can be implemented as ¼ watt resistors.

TABLE 1

Component values for the Programmable Access Transmitter

| | |
|---|---|
| R1, 21 | 100 ohms |
| R2-R7 | 20k |
| R8, 11, 13, 16 | 10k |
| R9, 10, 12 | 510 ohms |
| R14, 17, 18 | 2k |
| R15 | 51 ohms |
| R19 | 51K |
| R20 | 100k |
| R22 | 150 ohms |
| R23 | 10 ohms |
| D1 | 1N4001 |
| D2 | 1N5245 |
| D3 | 1N34 |
| C1 | 470 uF 16V |
| C2 | 47 uF 16V |
| C3, 4 | 15 pF 50V |
| C5 | 47pF 50V |
| C6 | 2.8–12.5 pF 50V |
| C7, 8, 9 | .1uF 50V |
| C10 | 150pF 50V |
| L1 | 1 inch × .25 inch loop |
| L2 | 2.7 uH |
| L3 | 6 turns #30 wire, .25 inch I.D. |
| U1 | LM7805 |
| U2 | PIC16C57-JW |
| U3 | MB81256-15 |
| LED1 | LN29RPP |
| LED2 | LN39GPP |
| LED3 | LN49YPP |
| Q1 | 2N918 |
| Q2 | 2N3904 |

Figure 3:
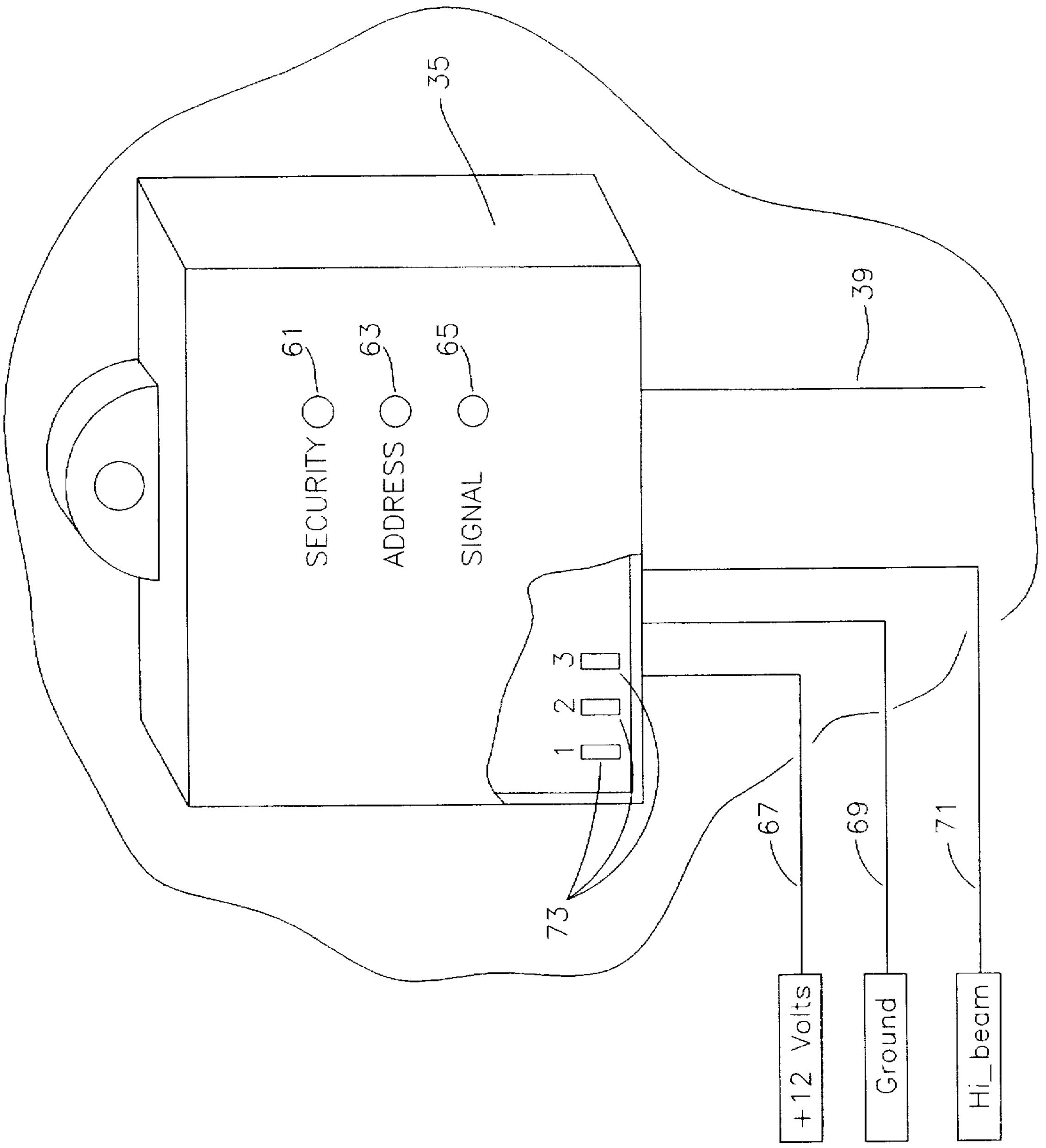
FIG. 3 is an enlarged view of the housing for the circuitry of FIG. 2 mounted with respect to the firewall of a vehicle and as was shown in FIG. 1, and illustrating the number and types of connection conductors required in one possible embodiment.

Referring to FIG. 3, an enlarged view of the access transmitter 35 with respect to the fire wall 37 is illustrated. Shown are apertures 61, 63 and 65, behind which are located the light emitting diodes LED1, LED2, and LED3. The designations "SECURITY," "ADDRESS," and "SIGNAL" may be located next to the apertures for identification. The antenna 39 is shown, as is the previously referred to input leads, including a positive power lead 67, a ground lead 69, and a high beam input lead 71.

The input lead 71 may be connected to the high beam input of the vehicle 21 headlamps, but in that event, a high signal might not be available to the input lead 71 unless the lights were on at the time. In many cars, the high beams may be flashed without the lights normally being on.

Also shown in cut-away fashion in FIG. 3, several banks of dip, or rocker switches 73 may be optionally provided to facilitate manual programming of the access transmitter 35. Normally these would not be used, especially since they would compromise the security available due to the use of a volatile memory. They are shown simply as an alternative. These may be programmed in a manner similar to which commonly available access transmitters and receivers are programmed.

Figure 4:
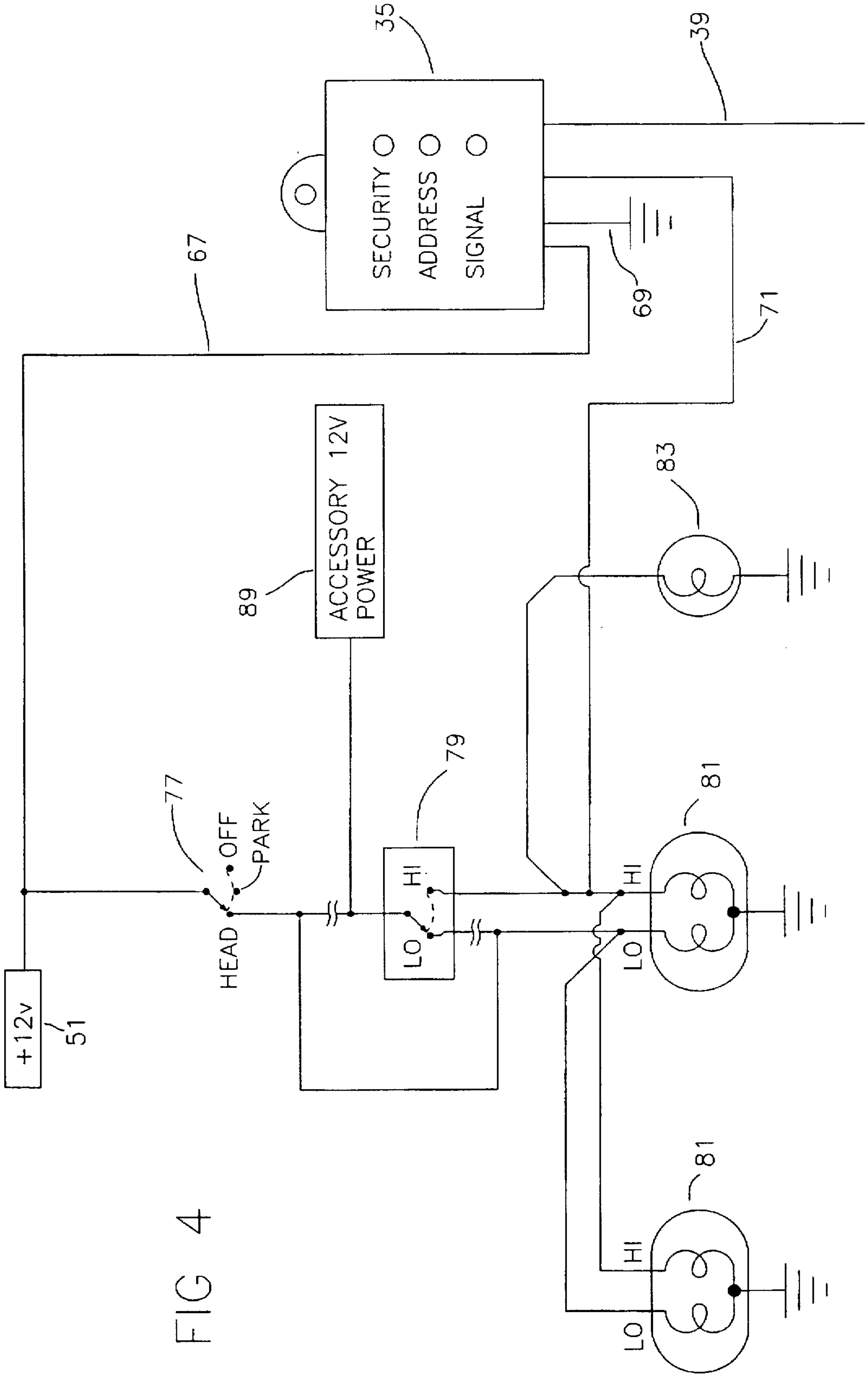
FIG. 4 is a schematic illustrating a possible configuration and modification for the electrical hookup of the dimmer conductor shown in FIG. 3 with respect to a vehicle electrical system.

The form of standard operation referred to above is configured such that the 12 volt operating positive potential is applied upstream of the dimmer switch, which can be switched to the headlights only while the vehicle 21 headlights are turned on. An alternate configuration is shown in FIG. 4 for changing the standard wiring on a vehicle. A battery 51 is connected into an instrument area shown with a dashed line format, through a circuit breaker 75 and on to a standard three position headlight switch 77. The three positions are OFF, PARK and HEAD, for the off, parking lights and headlights positions.

The HEAD position is typically connected to a dimmer switch 79. The dimmer switch 79 is shown as receiving a twelve volt signal and switching this twelve volt potential between a high beam position and a low beam position. Alternatively, the dimmer switch 79 could have a pass through intended for low beam activation and a switched portion to switch the high beam element on and off.

The low beam side of the dimmer switch 79 is connected to the low beam elements of headlights 81, while the high beam side of the dimmer switch 79 is connected to the high beam elements of headlights 81. A high beam indicator lamp 83 is typically mounted on the dash, and is wired to illuminate when the high beam lights are operating. As can be seen, typically the headlight switch 77 makes 12 volt power available to the dimmer switch 79, which then makes the power available to the headlamps, via either the high or low beams.

The alternative wiring for the standard vehicle 21 wiring involves cutting the positive power lines at various places shown by the ~designations. A first wire 85 is a jumper added downstream of the headlight switch 77 and between headlight switch 77 the low beam conductors leading to the headlights 81. In instances where the dimmer switch 79 has a by pass portion, as previously mentioned, the addition of such a first wire 85 is not necessary.

A second wire 87 should be installed between the vehicle 21's accessory 12 volt power source 89, and a point upstream of the dimmer switch 79. With these wiring changes, the headlight switch 77 still controls the low beam headlights 81. The high beams will be controlled with the dimmer switch 79. With this configuration, the high beams will be controllable whether or not the headlights are switched on. Note line 71 leading away from a connection between the headlight dimmer switch 79 and the headlamp 81, for triggering the access transmitter 35.

In the schematic of FIG. 4, the dimmer switch 79 is connected directly to the 12 volt power supply 51. Dimmer switch 79 can not only be a switch which operates the vehicle headlights between a high beam and low beam position, but may also be of the momentary contact type switch whereby the vehicle headlights may be flashed, even if the headlights of the vehicle are not otherwise turned on at the time the momentary switch is activated. At a point downstream of the dimmer switch 79, the second side of the dimmer switch 79 is connected to the high beam input lead 71. The second side of the dimmer switch 79 is also connected to the headlight switch 77. The headlight switch 77 is connected to the low beam side of headlights 81 with the other terminal of low beam side of the headlights 81 being connected to ground.

In this configuration, the dimmer switch acts to actuate the access transmitter 35 even though the headlights 81 are off. When the headlights 81 are on, the dimmer switch can still act to actuate the access transmitter 35.

Access transmitters generally operate on distinct frequencies in the range of 300 to 400 MHz. The access transmitter 35 of the present invention is intended to operate on any FCC approved frequency. A circuit 91 for detecting the most utilized frequencies of the portable access transmitters which are utilized to program the access transmitter 35 of the present invention is shown beginning with FIG. 5. The component parts will each begin with the designation "F" in order to distinguish them from the component parts discussed with respect to FIG. 2.

Figure 5:
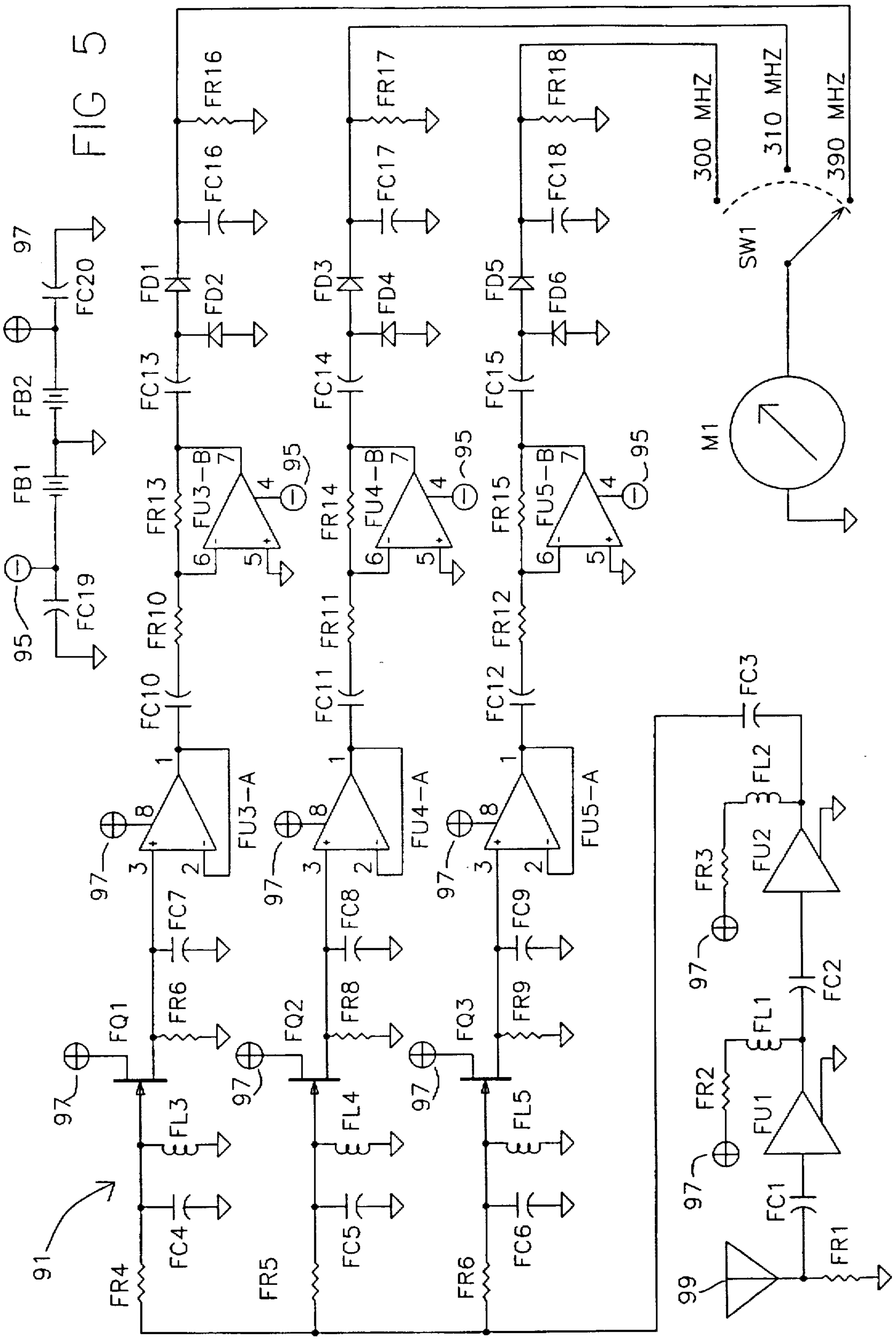
FIG. 5 is an electrical schematic for a circuit which can be utilized to test a particular transmitter to determine the operating frequency.

The power supply of the circuit 91 is shown along the top side of FIG. 5. A center tap 93 is connected to the positive side of a battery FB1 and to the negative side of a battery FB2. The negative side of battery FB1 forms the negative power supply 95, and is also connected to ground through a capacitor FC14. The positive side of battery FB2 forms the positive power supply 97, and is also connected to ground through a capacitor FC15.

At the lower left corner of FIG. 5 is an antenna 99 which need not be of significant size since it is contemplated that the portable access transmitter be placed adjacent to the antenna 91 or adjacent to the housing for the circuit of FIG. 5. Antenna 99 is connected to ground through a resistor FR1 and to the input of an operational amplifier FU1 through a capacitor FC1. The output of operational amplifier FU1 is connected to the positive power supply 97 through a series combination of an inductor FL1 and a resistor FR2. The output of operational amplifier FU1 is also connected to the input of an operational amplifier FU2. The output of operational amplifier FU2 is connected to the positive power supply 97 through a series combination of an inductor FL2 and a resistor FR3. The output of operational amplifier FU2 is also connected to a first side of a capacitor FC3. The second side of capacitor FC3 is connected to three main circuit paths.

In the first main circuit path, the second side of capacitor FC3 is connected through a resistor FR4 to the gate of a field effect transistor FQ1. The gate is connected to ground through a capacitor FC4 and connected to ground through an inductor FL3. The drain of transistor FQ1 is connected to the positive power supply 97, while the source of transistor FQ1 is connected to the positive input of an operational amplifier FU3-A. The positive input of operational amplifier FU3-A is also connected to ground through a resistor FR7 and connected to ground through a capacitor FC7. The negative input of operational amplifier FU3-A is connected to its output. Operational amplifier FU3-A is connected to the positive power supply 97.

The output of operational amplifier FU3-A is connected to the negative input of an operational amplifier FU3-B through a series combination of a capacitor FC10 and a resistor FR10. The positive input of operational amplifier FU3-B is connected to ground. The negative input of operational amplifier FU3-B is connected to its output through a resistor FR13. Operational amplifier FU3-B is connected to the negative power supply 95.

The output of operational amplifier FU3-B is connected to the current input terminal of a diode FD1 through a capacitor FC13. The current input terminal of diode FD1 is also connected to the current output terminal of a diode FD2. The current input terminal of a diode FD2 is connected to ground.

The current output terminal of diode FD1 is connected to ground through a parallel combination of capacitor FC16 and resistor FR16. The current output terminal of diode FD1 is also connected to one selection position of a three position switch SW1. The other terminal of selection switch SW1 is connected to a meter M1. The other side of meter M1 is connected to ground. The selection position for the output terminal of diode FD1 is shown as a 390 MHz position. The other positions are labeled 300 and 310 MHz and will be discussed later.

Referring back to the left side of FIG. 5, in the second main circuit path, the second side of capacitor FC3 is connected through a resistor FR5 to the gate of a field effect transistor FQ2. The gate is connected to ground through a capacitor FC5 and connected to ground through an inductor FL4. The drain of transistor FQ2 is connected to the positive power supply 97, while the source of transistor FQ2 is connected to the positive input of an operational amplifier FU4-A. The positive input of operational amplifier FU4-A is also connected to ground through a resistor FR8 and connected to ground through a capacitor FC8. The negative input of operational amplifier FU4-A is connected to its output. Operational amplifier FU4-A is connected to the positive power supply 97.

The output of operational amplifier FU4-A is connected to the negative input of an operational amplifier FU4-B through a series combination of a capacitor FC11 and a resistor FR11. The positive input of operational amplifier FU4-B is connected to ground. The negative input of operational amplifier FU4-B is connected to its output through a resistor FR14. Operational amplifier FU4-B is connected to the negative power supply 95.

The output of operational amplifier FU4-B is connected to the current input terminal of a diode FD3 through a capacitor FC14. The current input terminal of diode FD3 is also connected to the current output terminal of a diode FD4. The current input terminal of a diode FD4 is connected to ground.

The current output terminal of diode FD3 is connected to ground through a parallel combination of a capacitor FC17 and a resistor FR17. The current output terminal of diode FD3 is also connected to another selection position of a three position switch FSW1, as previously described.

Referring back to the left side of FIG. 5, in the third main circuit path, the second side of capacitor FC3 is connected through a resistor FR6 to the gate of a field effect transistor FQ3. The gate is connected to ground through a capacitor FC6 and connected to ground through an inductor FL5. The drain of transistor FQ3 is connected to the positive power supply 97, while the source of transistor FQ3 is connected to the positive input of an operational amplifier FU5-A. The positive input of operational amplifier FU5-A is also connected to ground through a resistor FR9 and connected to ground through a capacitor FC9. The negative input of operational amplifier FU5-A is connected its output. Operational amplifier FU5-A is connected to the positive power supply 97.

The output of operational amplifier FU5-A is connected to the negative input of an operational amplifier FU5-B through a series combination of a capacitor FC12 and a resistor FR12. The positive input of operational amplifier FU5-B is connected to ground. The negative input of operational amplifier FU5-B is connected its output through a resistor FR15. Operational amplifier FU5-B is connected to the negative power supply 95.

The output of operational amplifier FU5-B is connected to the current input terminal of a diode FD5 through a capacitor FC15. The current input terminal of diode FD5 is also connected to the current output terminal of a diode FD6. The current input terminal of a diode FD6 is connected to ground.

The current output terminal of diode FD5 is connected to ground through a parallel combination of capacitor FC18 and resistor FR18. The current output terminal of diode FD5 is also connected to another selection position of a three position switch SW1, as previously described.

The values which are used in the circuit of FIG. 5 are given in Table 2 as follows. Again all resistors are may have a power rating of ¼ watt.

TABLE 2

| Frequency Detector Component Values | |
|---|---|
| FR1, 10, 11, 12 | 1K |
| FR2, 3 | 510 ohms |
| FR4, 5, 6 | 150 ohms |
| FR7, 8, 9, 16, 17, 18 | 51K |
| FR13, 14, 15 | 20K |
| FC1, 2, 3, 7, 8, 9 | 50 pF 50V |
| FC4 | 10 pF 50V |
| FC5 | 12 pF 50V |
| FC6 | 12 pF 50V |
| FC10–18 | 10uF 16V |
| Q1, 2, 3 | MPF102 |
| FL1, 2 | 2.7 uH |
| FL3 | .017 uH ( tune for 390 Mhz) |
| FL4 | .021 uH ( tune for 310 Mhz) |
| FL5 | .022 uH ( tune for 300 Mhz) |
| FU1 ,2 | MAFR6 |
| FU3, 4, 5 | LM358A |
| FD1–6 | 1N914 |
| SW1 | single pole 3 position |
| M1 | 0–1 Volt meter |
| FB1, 2 | 9 volt |

Figure 6:
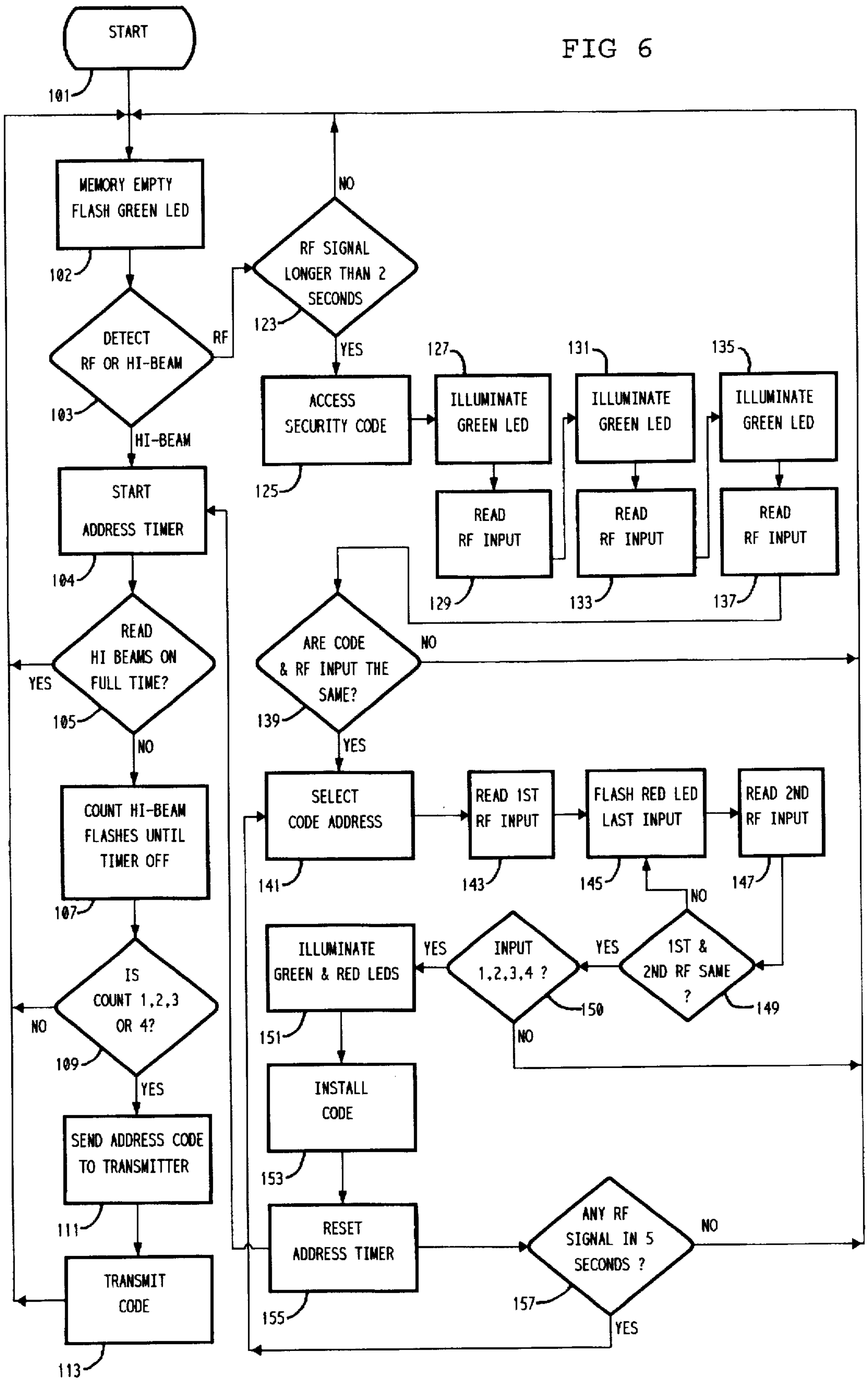
FIG. 6 is a logic flow diagram illustrating the logical progression of one programming embodiment of the present invention.

The programming and operations flow chart is given in FIG. 6. Beginning with a start block 101, the logic flows to a MEMORY EMPTY FLASH GREEN LED block 102. This step will continuously flash the green security light emitting diode LED2 shown in FIG. 2, upon initial installation, when power loss has occurred, or when all memories have been intentionally cleared. From the MEMORY EMPTY FLASH GREEN LED block 102, the logic flows to the DETECT RF OR HIGH BEAM decision diamond 103. At this point the programming can go either to programming or to transmit mode, based upon the receipt of a legitimately strong RF signal or hi-beam activation. The logic flow point is usually resident at this decision diamond 103 during operation, waiting for activation of the dimmer switch 79.

From the DETECT RF OR HI BEAMS decision diamond 103, the logic flows to a START ADDRESS TIMER block 104. START ADDRESS TIMER block 104 is used to clock the dimmer switch 79 activations based upon the number of addresses filled. To prevent an undue delay in time before a transmission is accomplished, the access transmitter 35 uses differing amounts of time delay based upon which memories are filled.

For example, it has been found that delay times corresponding to memory locations of 0.75 seconds for 1 filled memory, 1.50 seconds for 2 filled memories, 2.25 seconds for 3 filled memories, and, 3.00 seconds for 4 filled memories, works well.

The logic then flows to a HI-BEAMS ON FULL TIME decision diamond 105. If the dimmer switch 79 is actuated once, and left in the actuated position, the access transmitter 35 reads the continued high beam operation as requiring no transmissive activity, and the logic flows back to the DETECT RF OR HI BEAMS decision diamond 103.

A "no" result causes the logic to flow to a COUNT # OF HI BEAM FLASHES UNTIL TIMER OFF block 107 which records the flash count, or number of times in rapid succession which the dimmer is actuated. The number of times the dimmer is actuated will correspond to which memory is to be addressed and consequently which code will be sent.

The logic then flows to a CHECK IS COUNT 1, 2, 4, OR 4? decision diamond 109. If the dimmer switch 79, for example is actuated more times than there are current addresses having code signals stored in them, then an error has occurred. A "no" result is indicative of an error, and the logic then flows back to the DETECT RF OR HI BEAM decision diamond 103, to wait for further actuation of the dimmer switch 79. A "yes" result is indicative of a no error condition and the logic flows to a SEND CODE FROM REQUESTED ADDRESS TO TRANSMITTER command block 111. Since no errors were found, the only step left is to send the stored code corresponding to the address which was selected by actuating the dimmer switch a given number of times in rapid succession. The stored code is then sent to and used to modulate the transmitter to send the stored code to operate an entry access system. Once the stored code is sent to the transmitter, the logic flows to a TRANSMIT CODE command block 113 where the microprocessor triggers the transmitter to begin transmission of the code which was sent. The logic then returns to the DETECT RF OR HI BEAM decision diamond 103, to wait for further actuation instructions.

Referring to the programming logic flow, if the decision at the DETECT RF OR HI BEAM decision diamond 103 is that of RF, the logic flows to a RF SIGNAL LONGER THAN 2 SECONDS decision diamond 123. A "no" result causes the logic to flow back to the DETECT RF OR HI BEAM decision diamond 103, to wait for further actuation instructions. A "yes" result causes the logic to an ACCESS PROGRAM SECURITY block 125. The logic then flows to an ILLUMINATE GREEN LED-1ST CODE block 127, and then to a READ INPUTS block 129. The logic then, in cascading fashion, flows to an ILLUMINATE GREEN LED-2ND CODE block 131, and then to a READ INPUTS block 133, and then to an ILLUMINATE GREEN LED-3RD CODE block 135, and then to a READ INPUTS block 137. It is contemplated that such a cascade of pairs of blocks may continue for each set of codes which are to be read into and stored in the access transmitter 35.

The logic then flows to a ARE CODE & RF INPUTS THE SAME decision diamond 139. If the comparison is negative, the logic flows to the DETECT RF OR HI BEAM decision diamond 103. If a comparison is positive, the logic flows to an SELECT CODE ADDRESSES block 141. The logic then flows to a READ 1ST RF INPUT block 143. The logic then flows to a FLASH RED LED LAST INPUT block 145 in which the red light emitting diode LED1 illuminates a number of times to correspond to the number of inputs received. The logic then flows to a READ 2ND RF INPUT block 147 where an RF signal is detected by the access transmitter 35. The logic then flows to a 1ST & 2ND RF SAME decision diamond 149 where the RF signal just detected by the access transmitter 35 is compared to a stored input. If the comparison is negative, the logic flows back to the FLASH RED LED LAST INPUT block 143. If the comparison is positive, the logic flows to INPUT 1, 2, 3, 4? input 150. This process ensures a legitimate address is being processed.

If "no" then the logic flows back to the DETECT RF OR HI BEAM decision diamond 103. A "yes" result means that the address has been successfully accepted and the logic flows to the ILLUMINATE GREEN & RED LEDS block 151 which sets the processor ready to input code to memory.

The logic then flows to an INSTALL CODE block 153 where the portable access transmitter code is installed. Once the installation is complete, all light emitting diodes will shut off. The logic then flows to a RESET ADDRESS TIMER command block 155. The logic then flows to a ANY RF SIGNAL IN 5 SECONDS decision diamond 157. A "yes" result causes the logic to flow back to SELECT CODE ADDRESS block 141. A "no" result causes the logic to flow to DETECT RF OR HI BEAM decision diamond 103.

Figure 7:
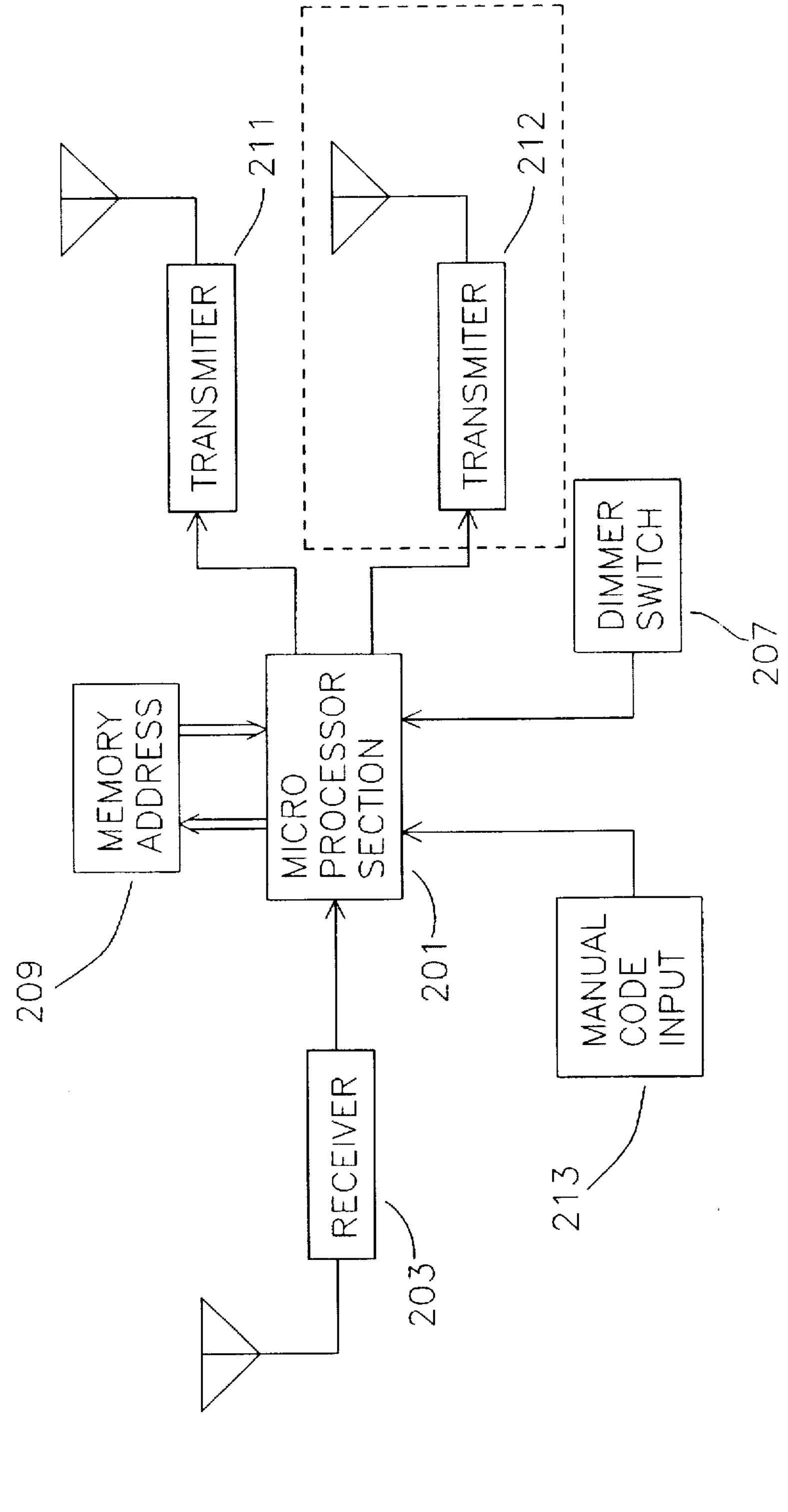
FIG. 7 illustrates a block diagram showing one possible configuration for the access transmitter of the present invention.

Referring to FIG. 7, a block diagram illustrates the working parts of the access transmitter 35 of the present invention. A microprocessor section 201 includes the microprocessor U2 and associated electronic components shown in previous Figures. A receiver 203, is connected to microprocessor 201. The connection may include a single signal line or a bus line and signal present line. When the receiver 203 receives a signal of sufficient strength, it is sensed by the microprocessor section 201. This receiver 203 should not be too sensitive, since the programming activity is to be initiated only upon a strong signal source, such as a portable access control transmitter, placed near or directly on the access transmitter 35.

A dimmer switch block 207 is connected to microprocessor section 201 and represents the dimmer signal, regardless of the circuit configuration. Although the circuit configuration of FIG. 4 is possible there may be many others. Dimmer switch block 207 is representative of any dimmer or other actuating signal. Such may be accomplished through a separate switch mounted under the dash, if desired.

Microprocessor section 201 can access a memory address block 209, both to store and retrieve memory contents in one or more memory addresses. Microprocessor section 201 can access one or more transmitters, for example transmitters 211 an 212. Microprocessor section 201 can also cause to be passed to transmitter 211 the stored code with which a transmission is to be modulated in order to have the signal detected to selectively actuate access control equipment accessible upon receipt of a code. An optional manual code input block 213 enables manual input of the access code to the microprocessor section block 201. Manual input may be by setting dip switches, or by keypad input.

One possible programming implementation is shown at the end of the specification and before the beginning of the claims. It does not contain a provision for triggering a second transmitter, however such a programming change would be simply a direction to activate one output of the microprocessor U2 rather than another.

While the present invention has been described in terms of a personal electronics directory, one skilled in the art will realize that the structure and techniques of the present invention can be applied to many appliances. The present invention may be applied in any situation where a computer chip needs to be accessed quickly, without the need for a technician, and without any special tools.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

```
;*************************************************************
                     REGISTER       EQUATES
w                      equ            0h
rtcc                   equ            1h
pc                     equ            2h
status                 equ            3h
fsr                    equ            4h
port_a                 equ            5h
port_b                 equ            6h
port_c                 equ            7h
last_try               equ            08h
flash_time             equ            09h
programs               equ            0ah
pass_code              equ            0bh
code_input1            equ            0ch
code_input2            equ            0dh
code_input3            equ            0eh
security_code1         equ            0fh
security_code2         equ            10h
security_code3         equ            11h
have_rf                equ            12h
port_stat              equ            13h
delay_low              equ            14h
delay_mid              equ            15h
delay_hi               equ            16h
click_count            equ            17h
time_low               equ            18h
time_hi                equ            19h
temp                   equ            1ah
temp1                  equ            1bh
ram_set                equ            1ch
count_low              equ            1dh
count_hi               equ            1eh
refresh_counter        equ            1fh
cy                     equ            0
dc                     equ            1
z                      equ            2
pd                     equ            3
to                     equ            4
;*****************************************************
org         0
;************************************************************
load_ram
            movlw      00h
            movwf      count_hi
load1
            movlw      00h
            movwf      count_low
            goto       load3
load2
            nop
            nop
            nop
            nop
            nop
            nop
            nop
            nop
load3
            clrwdt
            movf       ram_set,w
            bcf        port_a,0
            andlw      01h
```

```
        iorwf     port_a,1
        movf      count_low,w
        movwf     port_b
        bcf       port_a,3
        rrf       ram_set,w
        bcf       port_a,0
        andlw     01h
        iorwf     port_a,1
        movf      count_hi,w
        movwf     port_b
        bcf       port_a,2
        bcf       port_a,1
        bsf       port_a,2
        bsf       port_a,3
        bsf       port_a,1
        incfsz    count_low
        goto      load2
load4
        incfsz    count_hi
        goto      load1
        retlw     0
;**********************************************
send_ram
        bsf       port_a,2
        movlw     00h
        movwf     count_hi
send1
        movlw     00h
        movwf     count_low
        goto      send3
send2
        nop
        nop
        nop
        nop
        nop
        nop
        nop
send3
        clrwdt
        nop
        movf      ram_set,w
        bcf       port_a,0
        andlw     01h
        iorwf     port_a,1
        movf      count_low,w
        movwf     port_b
        bcf       port_a,3
        rrf       ram_set,w
        bcf       port_a,0
        andlw     01h
        iorwf     port_a,1
        movf      count_hi,w
        movwf     port_b
        bcf       port_a,1
        bsf       port_a,3
        nop
        rlf       port_c,1
        bsf       port_a,1
        incfsz    count_low
        goto      send2
send4
        incfsz    count_hi
```

```
        goto    send1
        bcf     port_c,1
        retlw   0
;*****************************************************
refresh
        clrwdt
        movlw   0
        movwf   port_b
        bsf     port_a,1
ref1
        bcf     port_a,3
        bsf     port_a,3
        incfsz  port_b,1
        goto    ref1
        retlw   0
;*****************************************************
green_1
        bsf     port_c,5
        movlw   020h
        movwf   delay_hi
        movlw   0h
        movwf   port_stat
green_2
        movlw   0ffh
        movwf   delay_low
        call    refresh
green_3
        movfw   port_c
        iorwf   port_stat,1
        clrwdt
        decfsz  delay_low,1
        goto    green_3
        decfsz  delay_hi,1
        goto    green_2
        btfsc   port_stat,4
        goto    green_1
        movlw   2
        movwf   time_hi
        movlw   0fah
        movwf   time_low
        movlw   0h
        movwf   rtcc
green_4
        clrwdt
        btfss   rtcc,7
        goto    green_4
        movlw   0h
        movwf   rtcc
        call    refresh
        decfsz  time_low
        goto    green_4
        movlw   0fah
        movwf   time_low
        decfsz  time_hi
        goto    green_4
        bcf     port_c,5
        retlw   0
;*****************************************************
program_mode
        movlw   050h
        movwf   delay_hi
program_mode_1
        movlw   0h
```

```
        movwf   port_stat
        movlw   020h
        movwf   delay_mid
program_mode_2
        movlw   0ffh
        movwf   delay_low
        call    refresh
program_mode_3
        movfw   port_c
        iorwf   port_stat,1
        clrwdt
        decfsz  delay_low,1
        goto    program_mode_3
        decfsz  delay_mid ,1
        goto    program_mode_2
        btfss   port_stat,4
        retlw   0ffh
        decfsz  delay_hi ,1
        goto    program_mode_1
        retlw   0
;**************************************************************
short_delay
        movlw   064h
        movwf   delay_mid
        call    refresh
short_delay_1
        movlw   0ffh
        movwf   delay_low
short_delay_2
        clrwdt
        decfsz  delay_low,1
        goto    short_delay_2
        decfsz  delay_mid ,1
        goto    short_delay_1
        retlw   0
;*****************************************************
count_clicks
        movlw   0h
        movwf   click_count
        movlw   080h
        movwf   time_low
        bcf     have_rf,4
count_rf_1
        bcf     port_stat,4
        movlw   020h
        movwf   delay_hi
count_rf_2
        movlw   0ffh
        movwf   delay_low
        call    refresh
count_rf_3
        movfw   port_c
        iorwf   port_stat,1
        decfsz  delay_low,1
        goto    count_rf_3
        decfsz  delay_hi,1
        goto    count_rf_2
        movf    port_stat,w
        iorwf   have_rf,1
        btfsc   port_stat,4
        goto    count_rf_1
        btfsc   have_rf,4
        incf    click_count
```

```
count_clicks_4
          bcf       have_rf,4
          clrwdt
          decfsz    time_low,1
          goto      count_rf_1
          retlw     0
;************************************************************
long_delay
          movlw     010h
          movwf     delay_hi
long_delay_1
          movlw     064h
          movwf     delay_mid
long_delay_2
          movlw     0f0h
          movwf     delay_low
          call      refresh
long_delay_3
          decfsz    delay_low,1
          goto      long_delay_3
          clrwdt
          decfsz    delay_mid,1
          goto      long_delay_2
          decfsz    delay_hi,1
          goto      long_delay_1
          retlw     0
;*******************************************************
blink_clicks
          movf      click_count,w
          movwf     temp
          btfsc     status,z
          retlw     0ffh
blink_clicks_1
          bsf       port_c,6
          movlw     0f0h
          movwf     count_hi
blink_clicks_2
          movlw     0f0h
          movwf     count_low
          call      refresh
blink_clicks_3
          decfsz    count_low,1
          goto      blink_clicks_3
          clrwdt
          decfsz    count_hi,1
          goto      blink_clicks_2
          bcf       port_c,6
          movlw     0f0h
          movwf     count_hi
blink_clicks_4
          movlw     0f0h
          movwf     delay_low
          call      refresh
blink_clicks_5
          decfsz    count_low,1
          goto      blink_clicks_5
          clrwdt
          decfsz    count_hi,1
          goto      blink_clicks_4
          decfsz    temp
          goto      blink_clicks_1
          retlw     00h
;*******************************************************
```

```
rf_or_light
          movlw     0b0h
          movwf     delay_hi
          bcf       have_rf,4
rf_or_light_1
          bcf       port_stat,4

          movlw     020h
          movwf     delay_mid
rf_or_light_2
          movlw     0ffh
          movwf     delay_low
          call      refresh
rf_or_light_3
          movfw     port_c
          iorwf     port_stat,1
          btfsc     port_c,3
          retlw     0ffh
          decfsz    delay_low,1
          goto      rf_or_light_3
          decfsz    delay_mid,1
          goto      rf_or_light_2
          movf      port_stat,w
          iorwf     have_rf,1
          btfsc     port_stat,4
          retlw     0ffh
          decfsz    delay_hi
          goto      rf_or_light_1
          retlw     00
;*********************************************************
is_there_rf
          bcf       port_stat,4
          movlw     020h
          movwf     delay_mid
is_there_rf_1
          movlw     0ffh
          movwf     delay_low
          call      refresh
is_there_rf_2
          movfw     port_c
          iorwf     port_stat,1
          decfsz    delay_low,1
          goto      is_there_rf_2
          decfsz    delay_mid,1
          goto      is_there_rf_1
          movf      port_stat,w
          iorwf     have_rf,1
          btfsc     port_stat,4
          retlw     0ffh
          retlw     00h
;***********************************************************
;              test program
;*********************************************************
startup
;         movlw     1
;         movwf     click_count
;         call      blink_clicks
;         movlw     0
;         movwf     ram_set
;         call      load_ram
;         incf      ram_set
;         call      load_ram
;         incf      ram_set
```

```
;               call     load_ram
;               incf     ram_set
;               call     load_ram
main
                nop
                movlw    05h
                option
                movlw    00h
                tris     port_a
                movlw    9dh
                tris     port_c
                movlw    0eh
                movwf    port_a
                movlw    0
                movwf    port_b
                movwf    port_c
                movlw    0
                movwf    programs
main_1
                movlw    0
                movwf    pass_code
                movlw    0ffh
                tris     port_b
                nop
                nop
                nop
                nop
                nop
                movf     port_b, w
                movwf    security_code1
                movlw    03h
                andwf    security_code1,1
                movf     port_b, w
                movwf    security_code2
                rrf      security_code2
                rrf      security_code2
                movlw    03h
                andwf    security_code2,1
                movf     port_b, w
                movwf    security_code3
                rrf      security_code3
                rrf      security_code3
                rrf      security_code3
                rrf      security_code3
                movlw    03h
                andwf    security_code3,1
                movlw    00h
                tris     port_b
main_2
                call     program_mode
                movwf    temp
                btfsc    temp,1
                goto     main_1
                call     green_1
                call     count_clicks
                movf     security_code1,w
                xorwf    click_count,w
                btfsc    status,z
                bsf      pass_code,0
                call     green_1
                call     count_clicks
                movf     security_code2,w
                xorwf    click_count,w
```

```
        btfsc    status,z
        bsf      pass_code,1
        call     green_1
        call     count_clicks
        movf     security_code3,w
        xorwf    click_count,w
        btfsc    status,z
        bsf      pass_code,2
        movf     pass_code,w
        xorlw    07h
        btfss    status,z
        goto     main
;*******************************************
get_ram_set
        bsf      port_c,6
        call     count_clicks
        movf     click_count,1
        btfss    status,z
        goto     get_ram_set_1
        bcf      port_c,6
        goto     transmit
get_ram_set_1
        movf     click_count,w
        movwf    ram_set
        bcf      port_c,6
        call     short_delay
        call     short_delay
        call     short_delay
        call     short_delay
        call     short_delay
        call     short_delay
        call     short_delay
        call     short_delay
        call     short_delay
        call     blink_clicks
        call     count_clicks
        movf     click_count,w
        xorwf    ram_set,w
        btfss    status,z
        goto     get_ram_set_1
        movf     click_count,w
        movwf    ram_set
        decf     ram_set
        movlw    0fch
        andwf    ram_set,w
        btfss    status,z
        goto     get_ram_set
        movf     ram_set,w
        btfsc    status,z
        bsf      program,0
        movlw    1
        xorwf    ram_set,w
        btfsc    status,z
        bsf      programs,1
        movlw    2
        xorwf    ram_set,w
        btfsc    status,z
        bsf      programs,2
        movlw    3
        xorwf    ram_set,w
        btfsc    status,z
        bsf      programs,3
        bsf      port_c,5
```

```
            bsf       port_c,6
            call      rf_or_light
            xorlw     0
            btfss     status,z
            goto      main_3
            movf      ram_set,w
            btfss     status,z
            goto      programs_1
            bcf       programs,0
programs_1
            movlw     1
            xorwf     ram_set,w
            btfss     status,z
            goto      programs_2
            bcf       programs,1
programs_2
            movlw     2
            xorwf     ram_set,w
            btfss     status,z
            goto      programs_3
            bcf       programs,2
programs_3
            movlw     3
            xorwf     ram_set,w
            btfsc     status,z
            bcf       programs,3
            bcf       port_c,5
            bcf       port_c,6
main_3
            call      load_ram
            bcf       port_c,5
            bcf       port_c,6
get_ram_set_2
            call      short_delay
            call      is_there_rf
            xorlw     0ffh
            btfsc     status,z
            goto      get_ram_set_2
            call      long_delay
            goto      get_ram_set
;**************************************************************************
transmit
            movlw     1
            movwf     flash_time
            btfsc     programs,3
            goto      four_counts
            btfsc     programs,2
            goto      three_counts
            btfsc     programs,1
            goto      two_counts
            goto      main_4
four_counts
            incf      flash_time,1
three_counts
            incf      flash_time,1
two_counts
            incf      flash_time,1
main_4
            call      rf_or_light
            andlw     0ffh
            btfsc     status,z
            goto      transmit
            movf      port_c,w
```

```
        btfss    port_c,3
        goto     main_1
        movlw    0
        movwf    click_count
        incf     click_count,w
        movwf    templ
        movf     port_c,w
        andlw    08h
        movwf    last_try
lights_on
        movlw    15
        movwf    time_low
lights_on_1
        call     short_delay
        movf     port_c,w
        andlw    08h
        movwf    temp
        movf     last_try,w
        xorwf    temp,w
        btfsc    status,z
        goto     lights_on_2
        btfsc    temp,3
        goto     lights_on_2
        incf     click_count
        bcf      status,0
        rlf      templ
lights_on_2
        movf     temp,w
        movwf    last_try
        decfsz   time_low
        goto     lights_on_1
        movf     click_count,w
        btfsc    status,z
        goto     transmit
        decfsz   flash_time
        goto     lights_on
        rrf      templ
        movf     templ,w
        andwf    programs,w
        btfsc    status,z
        goto     transmit
        decf     click_count,w
        movwf    ram_set
        call     send_ram
        goto     transmit
reset_vector
        org      7ffh
        goto     startup
        end
```

What is claimed:

1. A process of programming and actuating an access control transmitter comprising the steps of:

actuating a portable access transmitter in the vicinity of an antenna connected to a memory having at least two memory addresses and an access code associated with each memory address, wherein the portable access transmitter generates a coded signal, wherein said portable access transmitter is first actuated a multiple number of times to indicate a memory address and then actuated to transfer an access code using the coded signal generated by the portable access transmitter to said memory via a connected radio receiver;

actuating a switch;

selecting a memory address from said at least two memory addresses in said memory based upon the actuation of said switch;

transmitting a radio frequency signal modulated with said selected access code.

2. The process of claim 1, further comprising:

switching to a programming mode within said access control transmitter.

3. The process of claim 2, further comprising:

while in said programming mode, selecting said memory address indicated by said actuation of said portable transmitter from said at least two memory addresses; and storing said access code transferred using said coded signal generated by said portable access transmitter in said selected memory address.

4. The process of claim 2, further comprising:

returning to a transmit ready mode within said access control transmitter.

5. The process of claim 1, further comprising:

selecting an output frequency for said access control transmitter.

* * * * *